United States Patent
Drube et al.

(10) Patent No.: US 6,615,861 B2
(45) Date of Patent: Sep. 9, 2003

(54) LIQUID CYLINDER MANIFOLD SYSTEM

(75) Inventors: Paul Drube, Burnsville, MN (US); Paul Sjogren, Burnsville, MN (US)

(73) Assignee: Chart Inc., Burnsville, MN (US)

( * ) Notice: Subject to any disclaimer, the term of this patent is extended or adjusted under 35 U.S.C. 154(b) by 0 days.

(21) Appl. No.: 09/839,580

(22) Filed: Apr. 20, 2001

(65) Prior Publication Data

US 2002/0153041 A1 Oct. 24, 2002

(51) Int. Cl.[7] .................................................. G05D 9/12
(52) U.S. Cl. ......................................... 137/208; 137/210
(58) Field of Search ................................... 137/208, 210

(56) References Cited

U.S. PATENT DOCUMENTS

| | | | |
|---|---|---|---|
| 4,202,180 A | 5/1980 | Cox | 62/50 |
| 4,341,234 A | 7/1982 | Meinass et al. | 137/110 |
| 4,597,406 A | 7/1986 | Loiseau et al. | 137/113 |
| 5,025,824 A | 6/1991 | Maric | 137/113 |
| 5,062,443 A | 11/1991 | Maric | 137/113 |
| 5,136,852 A | 8/1992 | Neeser et al. | 62/50.4 |
| 5,421,161 A | 6/1995 | Gustafson | 62/7 |
| 5,924,291 A | 7/1999 | Weiler et al. | 62/50.2 |
| 5,937,655 A | 8/1999 | Weiler et al. | 62/50.1 |

*Primary Examiner*—Gerald A. Michalsky
(74) *Attorney, Agent, or Firm*—Piper Rudnick (57) ABSTRACT

A dispensing system allows cryogenic liquid to be dispensed from either a primary bank manifold and associated cylinders or a secondary bank manifold and associated cylinders. Each manifold includes a gas header and a liquid header. The associated cylinders communicate with the gas header through flexible lines and excess flow check valves and the liquid header through flexible lines and spring-loaded check valves. An automatic control system selects between dispensing from the primary bank manifold or the secondary bank manifold. A pressure gauge detects the pressure of the cryogenic liquid from the dispensing manifold. The pressure gauge is in communication with a controller which opens and closes the appropriate valves to begin dispensing cryogenic liquid from the originally idle manifold if the detected pressure drops below a predetermined minimum. After the manifold is switched over, the controller checks the pressure in the non-selected manifold. If pressure buildup occurs in the non-selected manifold due to residual liquid in the associated cylinders, the system is reconfigured to dispense the residual liquid.

13 Claims, 10 Drawing Sheets

LIQUID CYLINDER MANIFOLD SYSTEM

BACKGROUND OF THE INVENTION

The invention relates generally to cryogenic fluid dispensing systems, and, more particularly, to a manifold system for cryogenic fluid dispensing systems that use multiple liquid cylinders as the source of cryogenic fluid.

Cryogenic liquids, that is, liquids having a boiling point generally below −150° F. at atmospheric pressure, are used in a variety of applications. Many of these applications require that the cryogen be supplied as a high pressure gas. For example, high pressure nitrogen and argon gases are required for laser welding while high pressure nitrogen, oxygen and argon gases are required for laser cutting. Such cryogens are typically stored as liquids, however, because one volume of liquid produces many volumes of gas (600–900 volumes of gas per one volume of liquid) when the liquid is permitted to vaporize/boil and warm to ambient temperature. To store an equivalent amount of gas requires that the gas be stored at very high pressure. This would require heavier and larger tanks and expensive pumps or compressors.

Industrial applications such as laser welding and cutting require that the cryogenic gases be provided at pressures in the range of approximately 400–420 psi and flow rates in the range of approximately 1500–2500 SCFH. It is known in the prior art that such high pressures and flow rates may be obtained by connecting a number of cryogenic liquid storage tanks or cylinders together in parallel to form a "bank" of liquid cylinders. A prior art bank of cryogenic liquid cylinders is illustrated in FIG. 1.

Figure 1:
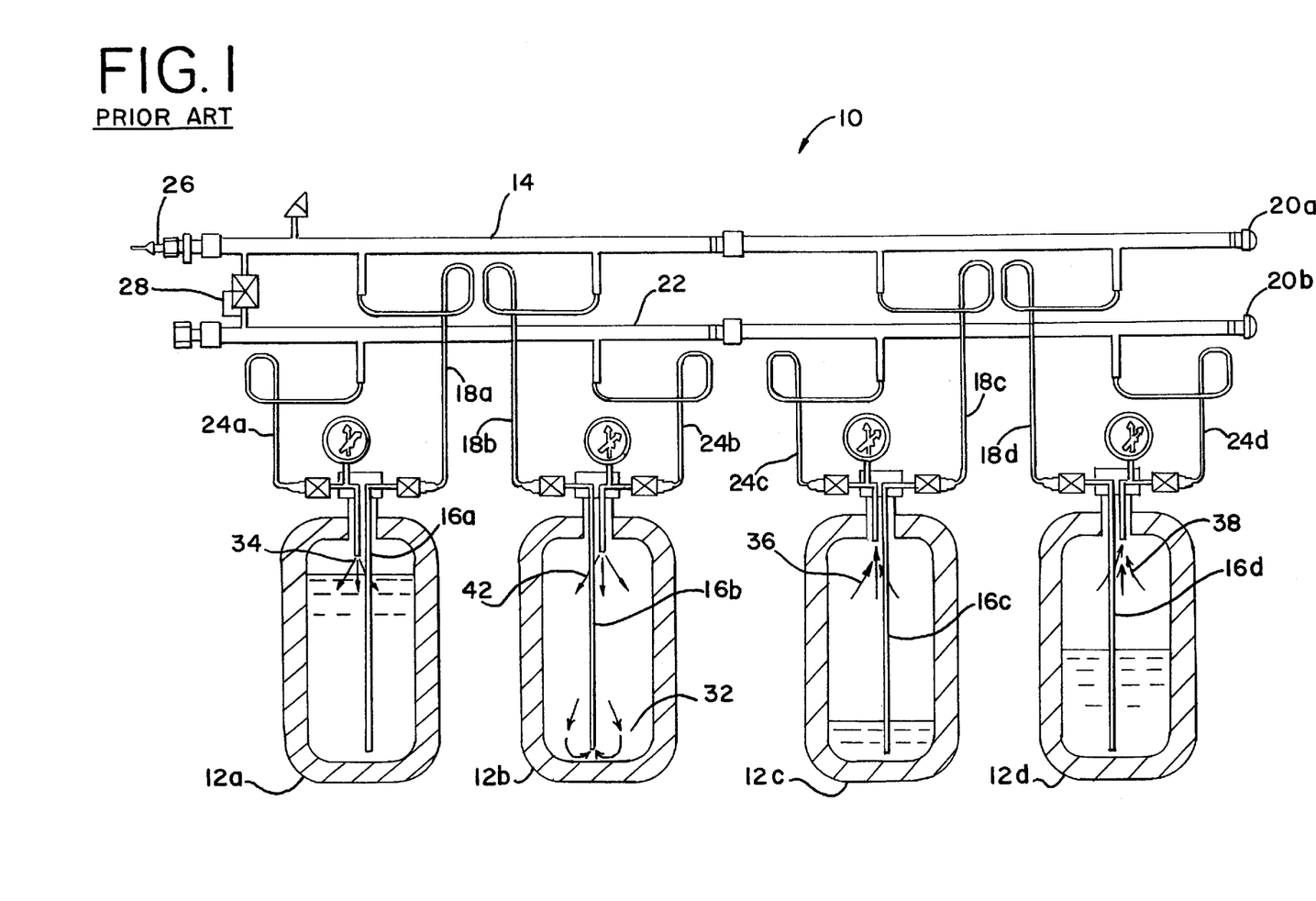
FIG. 1 is a schematic diagram of a prior art bank of liquid cylinders.

As illustrated in FIG. 1, the bank of cylinders features a manifold, indicated in general at 10, which is connected to insulated cryogenic liquid cylinders 12a–12d. More specifically, the manifold 10 includes a liquid header 14 that is connected to the dip tubes 16a–16d of cylinders 12a–12d via flexible lines 18a–18d. Similarly, the head spaces of cylinders 12a–12b are connected to a gas header 22 of manifold 10 by flexible lines 24a–24d. Liquid is forced out of the cylinders through their dip tubes due to the internal pressurization that occurs when the liquid within the cylinders vaporizes as it is warmed over time.

The bank of cylinders provides cryogenic liquid to a use point, typically including a vaporizer, through liquid header 14 and port 26. Gas header 22 equalizes the pressures within the cylinders. An economizer circuit 28 permits gas to be withdrawn directly from the head spaces of the cylinders and delivered to the use point when the pressure within the gas header exceeds a predetermined level. As a result, venting of cryogenic vapor is avoided. Greater flow rates at high pressures may be obtained by adding additional manifold sections and cylinders to the bank via fittings 20a and 20b.

Situations may occur, however, where liquid is withdrawn from one of the cylinders faster than the others. In such situations, one cylinder may empty of liquid prior to the other cylinders. Prior art manifolds encounter difficulties in handling such occurrences. More specifically, if liquid cylinder 12b empties of liquid prior to the other cylinders, as illustrated in FIG. 1, gas from cylinder 12b will quickly travel out of dip tube 16b, as illustrated by arrows 32, through liquid header 14 and out of port 26. As a result, the pressure within the bank will collapse as gas travels from the individual cylinders 12a, 12c and 12d into the gas header 22, as illustrated by arrows 34, 36 and 38, and into cylinder 12b, as illustrated by arrows 42. In other words, the vapor from cylinders 12a, 12c and 12d and gas header 22 escapes through the path of least resistance through the empty cylinder 12b, dip tube 16b, liquid header 14 and port 26. When the pressure within the bank of cylinders collapses, the system stops delivering high pressure cryogenic fluid and the operation (such as welding or cutting) is interrupted. It is therefore desirable to provide a manifold that prevents interruptions in the delivery of high pressure cryogenic fluid from a bank of liquid cylinders when the liquid supply in a cylinder is exhausted prior to the other cylinders in the bank.

Furthermore, if the liquid level in one cylinder drops below the liquid level of the other cylinders, system efficiency suffers. That is, when the liquid level within a cylinder becomes low, its internal pressure also drops. As a result, the pressure within the remaining cylinders also drops as vapor from the gas header 22 travels into the cylinder with the low liquid level. The bank of FIG. 1 therefore requires many cylinders to supply cryogenic fluid at an acceptable pressure and flow rate. In addition, if the pressure within one cylinder drops, liquid in the liquid header 14 may back flow into the low pressure cylinder so that fluid delivery is interrupted. It is therefore desirable to provide a manifold that withdraws liquidly evenly from a number of cylinders and prevents the back flow of liquid into the cylinders.

Prior art systems often combine two banks of cylinders of the type illustrated in FIG. 1. One bank is designated the "primary" or "service" bank while the other bank is designated the "secondary" or "reserve" bank. These are coupled through an electronic control system which typically flows the primary bank and, when it is exhausted of liquid, changes over automatically to the secondary bank and simultaneously activates an alarm. The electronic control system also typically provides a means by which the function of the two banks may be reversed after the empty cylinders of the primary bank are replaced.

An example of such a manifold control system may be found in U.S. Pat. No. 5,062,443 to Maric. The control system of the Maric '443 patent features first and second conduits that connect with primary and secondary cryogenic fluid supply sources (such as liquid cylinder banks). Each conduit includes both a pressure sensor that senses fluid flow pressure and a solenoid-operated on-off fluid flow control valve positioned downstream of the pressure sensor. An electrical circuit is in communication with the pressure sensors and controls the operation of the valves to switch them on and off so as to permit or prevent fluid flow through the respective conduit.

With both fluid sources available, the electrical circuit of the Maric '443 patent only permits one of the fluid sources to provide fluid flow at one time. When the first fluid source delivers fluid at a pressure below a predetermined minimum value, as detected by the first pressure sensor, the electrical circuit generates a signal to close the solenoid valve in the first conduit and simultaneously opens the solenoid valve in the second conduit so that the fluid flow then commences therein. The exhausted first fluid supply may then be replaced. The electrical circuit will switch back to the first fluid supply and conduit when the pressure within the second conduit drops below the predetermined minimum value. If the exhausted first fluid supply is not replaced and the second fluid supply becomes exhausted, the electrical circuit closes the solenoid valve of the second conduit, the solenoid valve of the first conduit remains closed and an alarm is activated. The system remains on standby until one or more of the fluid supplies is replaced.

While the control system of the Maric '443 patent is effective, the pressure within a conduit may fall below the predetermined minimum value while liquid remains in the corresponding fluid supply. As a result, the system may change over to the other conduit and fluid supply while liquid still exists in the original fluid supply. It is therefore desirable to provide a manifold control system that prevents residual liquid in the original primary or service liquid cylinder bank after change over to the secondary or reserve liquid cylinder bank.

Accordingly, it is an object of the present invention to provide a manifold that prevents interruptions in the delivery of high pressure cryogenic fluid from a bank of liquid cylinders when the liquid supply in a cylinder is exhausted prior to the other cylinders in the bank.

It is another object of the present invention to provide a manifold that withdraws liquidly evenly from a number of cylinders.

It is another object of the present invention to provide a manifold that prevents back flow of liquid into a cylinder of a cylinder bank.

It is still another object of the present invention to provide a manifold control system that prevents residual liquid in the original primary or service liquid cylinder bank after change over to the secondary or reserve liquid cylinder bank.

It is still another object of the present invention to provide a manifold through which simple and efficient change out of cylinders may be accomplished.

SUMMARY OF THE INVENTION

The present invention is directed a system for selectively dispensing cryogenic liquid from a primary bank manifold that is in communication with a first plurality of cylinders and a secondary bank manifold that is in communication with a second plurality of cylinders. The primary bank and secondary bank manifolds each include a gas header and a liquid header. The first plurality of cylinders communicate with the gas header of the primary bank manifold through excess flow valves and the liquid header through spring-loaded check valves. Similarly, the second plurality of cylinders communicate with the gas header and liquid header of the secondary bank manifold via excess flow and spring-loaded check valves, respectively. As a result, liquid is withdrawn from either the first or second plurality of tanks in a generally even fashion. In addition, sudden drops of manifold pressure when one of the cylinders in the first or second plurality of cylinders goes empty is avoided.

Selection between the dispensing of cryogenic liquid from either the primary bank manifold or the secondary bank manifold is controlled by an automated control system. The control system includes valves that control the flow of cryogenic liquid from the primary bank manifold and the secondary bank manifold to a use point line. Pressure gauges detect the pressure of the cryogenic liquid flowing from either one of the manifolds. The valves and pressure gauges communicate with a controller. If the pressure gauge corresponding to the manifold that is dispensing detects a drop in pressure to a level below a predetermined pressure, the controller closes the valve for the dispensing manifold and opens the valve for the other, originally idle, manifold. As a result, dispensing commences from the manifold that originally was sitting idle. The controller checks the pressure in the manifold that was originally dispensing to determine if the pressure therein has once again risen to a level above the predetermined pressure due to remaining residual liquid. If the pressure has once again risen to an acceptable level, the controller reconfigures the system to dispense from the originally dispensing manifold.

A control panel allows for manual manifold selection and indicates which manifold is selected and when there is a change in system status.

Economizer circuits in the manifolds and control system allow gas to be directed to the use point. As a result, venting of the manifold or cylinders is unnecessary.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 2:
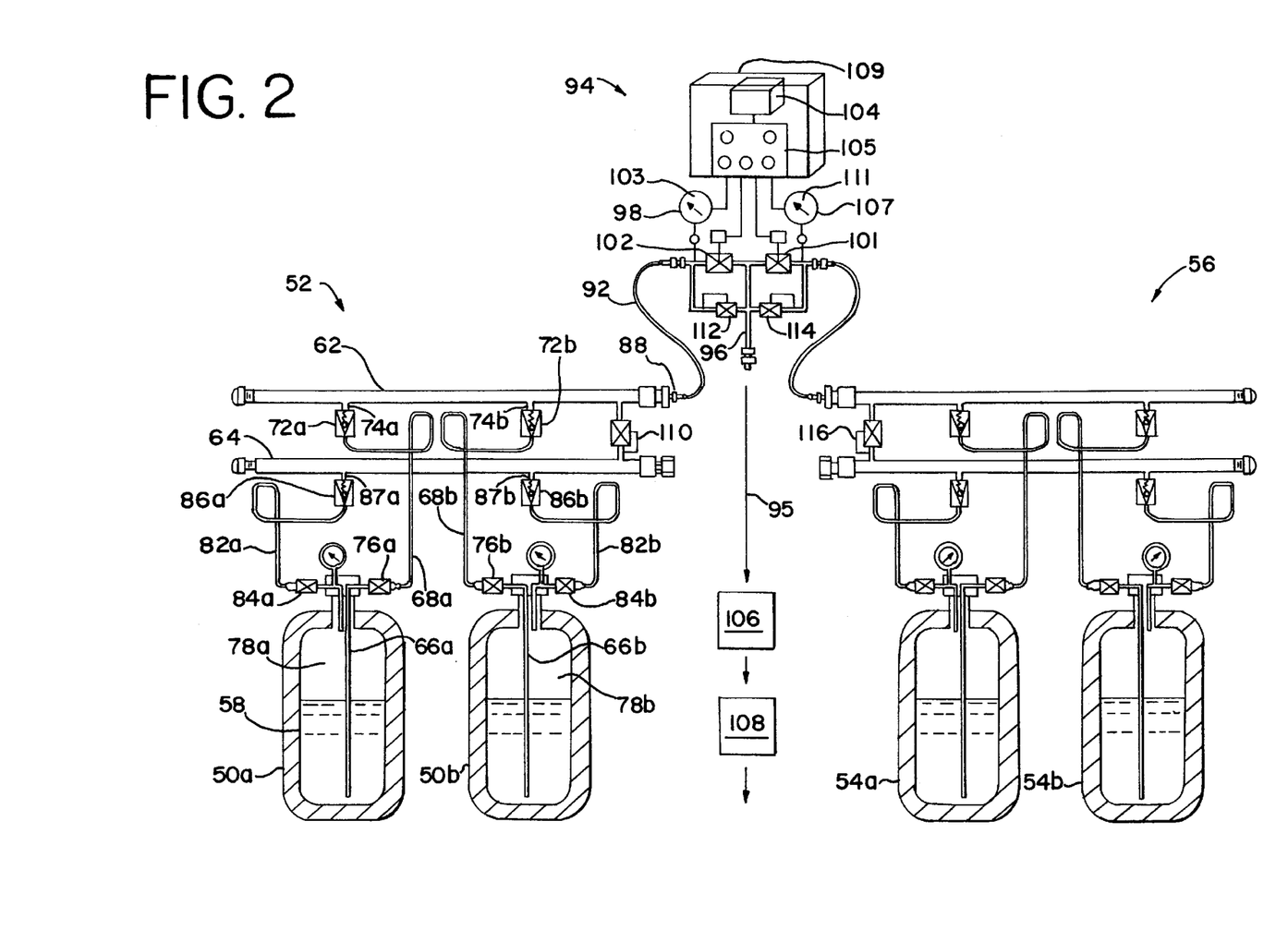
FIG. 2 is a schematic diagram of an embodiment of the liquid cylinder manifold system of the present invention.

A preferred embodiment of the liquid cylinder manifold system of the present invention is illustrated in FIG. 2. The system includes a primary or service bank of liquid cylinders 50*a* and 50*b* joined in parallel by a primary bank manifold, indicated in general at 52. The system also includes a secondary or reserve bank of cylinders 54*a* and 54*b* joined in parallel by secondary bank manifold, indicated in general at 56. Each liquid cylinder is insulated and contains a supply of cryogenic liquid 58 such as liquid argon, nitrogen or oxygen. Suitable cryogenic liquid cylinders include those sold under the name Laser-Cyl by Chart Industries, Inc. of Burnsville, Minn.

Details of the primary bank will now be provided with the understanding that the secondary bank is identical in construction. The primary manifold includes a liquid header 62 and a gas header 64. The dip tubes 66*a* and 66*b* of liquid cylinders 50*a* and 50*b*, respectively, are connected to the liquid header 62 by flexible lines 68*a* and 68*b*. Flexible lines 68*a* and 68*b* are preferably constructed of stainless steel. Spring-loaded check valves 72*a* and 72*b* are positioned between the liquid header inlet ports 74*a* and 74*b* and the flexible lines. As a result, liquid may only flow out of the liquid cylinders into the liquid header 62. In addition, each check valve isolates its corresponding cylinder from the liquid header in the event that the pressure within the liquid cylinder drops below the pressure within the liquid header. The flexible lines preferably are attached to the liquid cylinders by flare connectors 76*a* and 76*b*.

The head spaces 78*a* and 78*b* of the liquid cylinders are in communication with the gas header 64 via flexible lines 82*a* and 82*b*, which are preferably constructed of stainless steel. The flexible lines preferably are connected to the liquid cylinders by flare connectors 84*a* and 84*b*. Excess flow/excess flow check valves 86*a* and 86*b* are positioned between the flexible lines and the ports 87*a* and 87*b* of gas header 64. Excess flow check valve 86*a* closes when the flow of gas into liquid cylinder 50a exceeds a predetermined level. Similarly, excess control valve 86b closes when the flow of gas into liquid cylinder 50b exceeds a predetermined value.

The outlet port 88 of the liquid header 62 of manifold 52 communicates via flexible line 92 with an automatic control system, indicated in general at 94. After traveling through the control system 94, cryogenic liquid from the cylinders 50a and 50b and manifold 52 is directed to a use point, as indicated by arrow 95, through use point line 96.

Primary bank manifold 52 provides cryogenic liquid to the control system 94 and the use point through line 96 at a high pressure and flow rate in a consistent and uninterrupted fashion. This is accomplished by the manifold's novel arrangement of the spring-loaded check valves 72a and 72b on the liquid header 62 and excess flow check valves 86a and 86b on the gas header 64.

Liquid is driven out of dip tubes 66a and 66b of cylinders 50a and 50b, respectively, due to the pressure therein. The head space pressures of the cylinders are equalized by the gas header and the flexible lines 82a and 82b. As a result, cryogenic liquid tends to flow out of the cylinders to the liquid header in an even fashion. Discrepancies in the ambient heating of the two cylinders, leakage in the flexible lines and connections joining the cylinders to the manifold and other factors, however, may cause the liquid to be withdrawn from one cylinder faster than the other cylinder.

If cryogenic liquid is withdrawn from one cylinder faster than the other cylinder, the liquid cylinders obviously will feature different liquid levels. The pressure within the cylinder with the lower liquid level will drop. In such a situation, the spring-loaded check valve corresponding to the cylinder with the lower liquid level closes as the pressure within the liquid header 62 is higher than the pressure within the cylinder. Closure of the spring loaded check valve serves three purposes. First, the back flow of liquid into the cylinder having the lower liquid level and pressure is prevented. Second, the pressure within the cylinder with the lower liquid level builds due to the connection between its head space and gas header 64. Third, liquid is withdrawn only from the cylinder having the higher liquid level. As a result, the pressures within the two cylinders once again become equalized so that the check valve reopens. At this time, the liquid levels within the two cylinders are also once again nearly equal.

While the spring-loaded check valves 72a and 72b tend to equalize the liquid levels in the cylinders 50a and 50b, there still may b e slight variations. As explained with regard to FIG. 1, if one cylinder empties prior to the other, gas within the empty cylinder will rush out of the dip tube. As a result, the pressure within the empty cylinder will drop rapidly and gas from the gas header will flow into the empty cylinder at a very high flow rate so that the pressure in the manifold collapses.

The excess flow check valves illustrated at 86a and 86b in FIG. 2 close when gas from gas header 64 attempts to enter cylinders 50a or 50b, respectively, at a flow rate that is above a predetermined flow rate. As such, the excess flow check valves permit gas to enter the cylinders at the lower flow rates that occur when the cylinders are partially filled with liquid. An empty cylinder, however, is isolated from the gas header as the corresponding excess flow check valve closes in response to the otherwise high flow rate of gas into the empty cylinder. Because the pressure within the empty cylinder rapidly drops, the corresponding check valve of the liquid header also closes. As a result, the empty cylinder is quickly isolated from the gas and liquid headers and the remaining cylinders of the bank. As such, a sudden collapse of pressure for the bank is avoided and liquid delivery may continue from the remaining cylinders in an uninterrupted fashion. The empty cylinder may be quickly changed out via flare connectors 84a and 76a or 84b and 76b.

In summary, the novel combination of excessive flow check valves and spring-loaded check valves of the manifolds illustrated in FIG. 2 provide consistent withdrawal of liquid from cylinders, automatic isolation of empty cylinders and simple, efficient change out of cylinders.

As stated previously, cryogenic liquid leaves manifold 52 via outlet port 88 and travels to an automatic control system, indicated in general at 94. The pressure of the cryogenic liquid entering the control system is measured by pressure gauge and switch 98. The cryogenic liquid then flows through control valve 102 and ultimately out of line 96 to a use point. Both pressure gauge and switch 98 and control valve 102 communicate with a controller 104. Duplicate control valve 101 and pressure gauge and switch 107 communicate with the controller 104 and the secondary bank manifold 56 in the same fashion. Controller 104 communicates with a control panel 105. Controller 104 and control panel 105 are preferably mounted within an electronics cabinet 109. Examples of suitable controllers include the programmable logic controllers that are available from the Mitsubishi Corporation of Japan.

Pressure gauge and switch 98 includes a pressure switch set point slider 103. A user sets the slider 103 to a predetermined pressure. When the pressure measured by gauge and switch 98 drops below the predetermined set pressure, a signal is transmitted to the controller 104. Pressure gauge and switch 107 features set point slider 111 and operates in the same fashion. As will be described below, controller 104 then provides the appropriate indications via control panel 105, manipulates valves 102 and 101 and performs the appropriate processing. It should be noted that alternative types of pressure sensors and switches known in the art may be substituted for pressure gauge and switch 98 and pressure gauge and switch 107.

Prior to arriving at the use point (not shown), the cryogenic liquid typically encounters an ambient vaporizer 106 and a line regulator 108. The ambient vaporizer converts the cold cryogenic liquid to warm gas. The vaporizer should be slightly oversized to ensure peak flow demands do not result in cold gas or liquid exiting the vaporizer. The line regulator maintains precise control of the pressure of the high pressure and high flow cryogenic gas as it is delivered to the use point. An example of a suitable regulator is the CONCOA 623 series high flow regulator.

Manifold 52 includes an economizer circuit 110 positioned between the gas header 64 and liquid header 62. In addition, an economizer circuit 112 is provided for the automatic control system 94. The economizer circuits 110 and 112 work in cooperation to prevent the necessity of venting excess gas build up in the cylinders and gas header 64. Such a situation may occur, for example, when the system sits for a long period of time between uses. When the pressure within the cylinders and gas header exceeds the pressure setting of economizer circuits 110 and 112, gas flows through circuit 110, flexible line 92, circuit 112 and line 96 so that it is delivered to the use point. As a result, the economizer circuits provide increased efficiency as the gas is used at the use point instead of being vented to the atmosphere. The automatic control system 94 also provides a duplicate economizer circuit 114 that works in cooperation with secondary bank economizer circuit 116 to prevent the necessity of venting gas from the cylinders of the secondary bank manifold 56.

The automatic control system 94 allows the manifold system of the present invention to automatically switch over from the primary bank manifold 52 to the secondary bank manifold 56 when the liquid supply in cylinders 50a and 50b is exhausted. As the automatic switch over occurs, controller 104 provides various indications to the user via control panel 105. The operation of the automatic control system will now be described in greater detail with reference to FIGS. 3, 4a–4d and 5.

Figure 3:
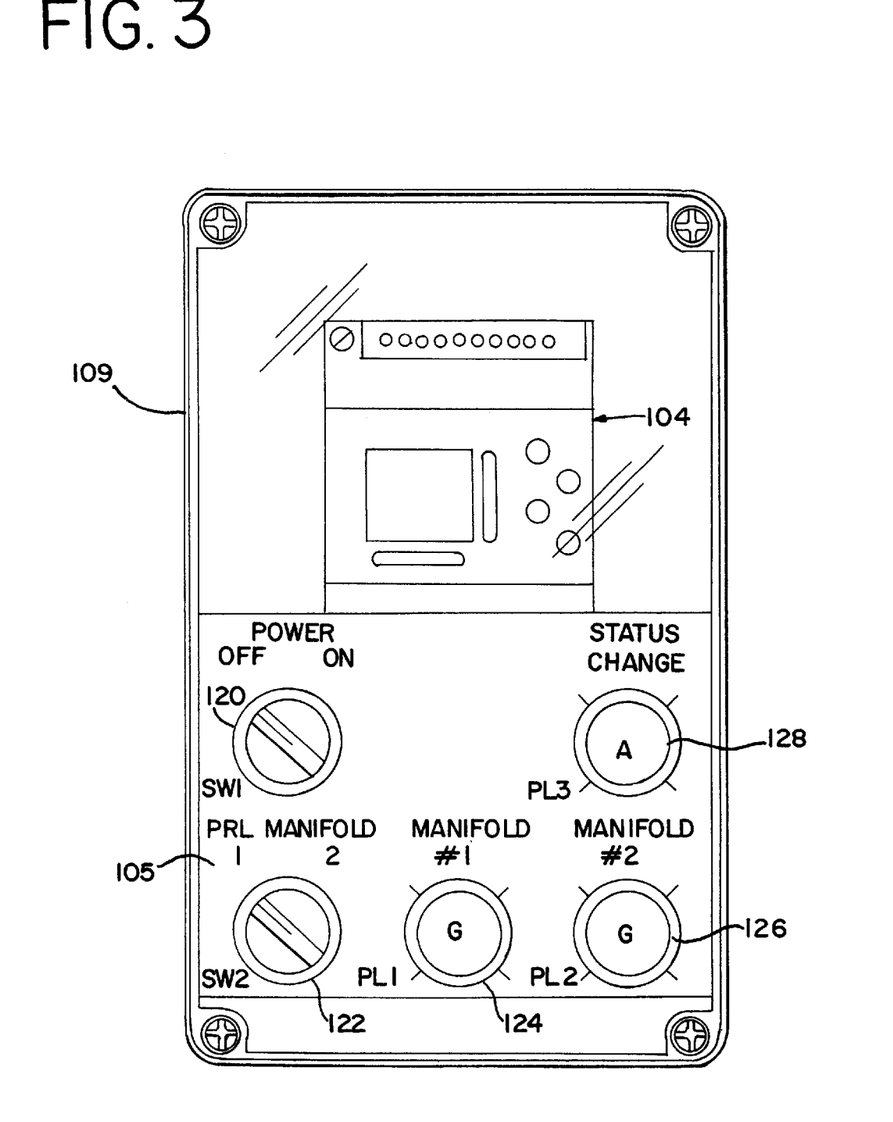
FIG. 3 is a front elevation view of the electronics cabinet, controller and control panel of the system of FIG. 2.

A detailed view of the controller 104, control panel 105 and electronics cabinet 109 is provided in FIG. 3. A power switch 120 on control panel 105 turns the controller 104 on. The control panel 105 also includes a manifold selector switch 122 that allows for manual selection between the primary and secondary bank manifolds and cylinders. The primary and secondary bank manifold lights 124 and 126, respectively, of control panel 105 illuminate and extinguish to indicate which manifold is selected. The status change light 128 of the control panel 105 illuminates when the controller detects a change in system status and a different manifold is selected. As explained below, the status change light 128 also blinks when a cylinder change out is required.

The operation of the system of FIG. 2 under the direction of controller 104 is illustrated in FIGS. 4A–4D. FIG. 5 is a flow diagram illustrating the logic of the controller 104.

Figure 4A:
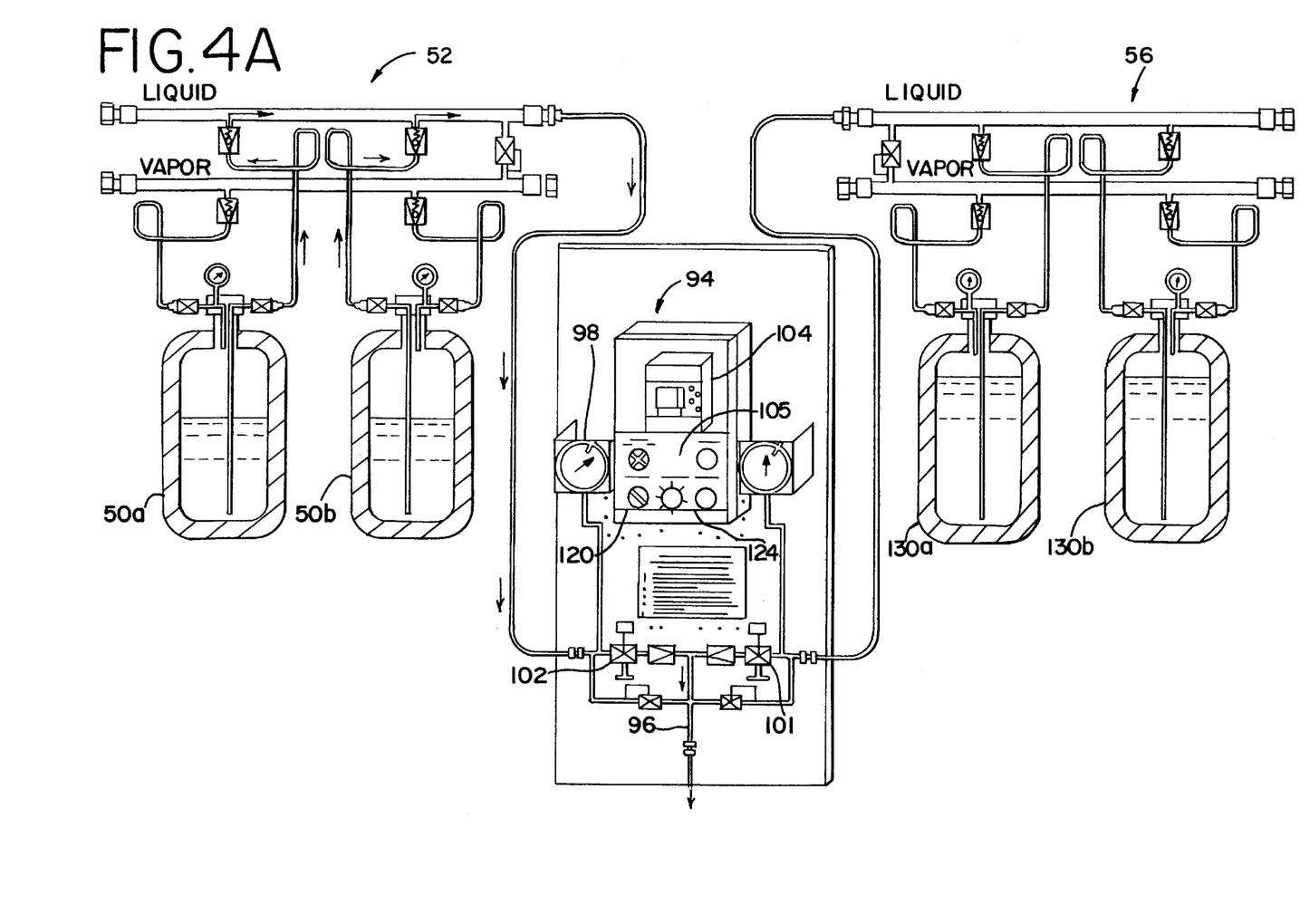
FIGS. 4A–4D are schematic diagrams illustrating the operation of the system of FIG. 2.
Figure 5:
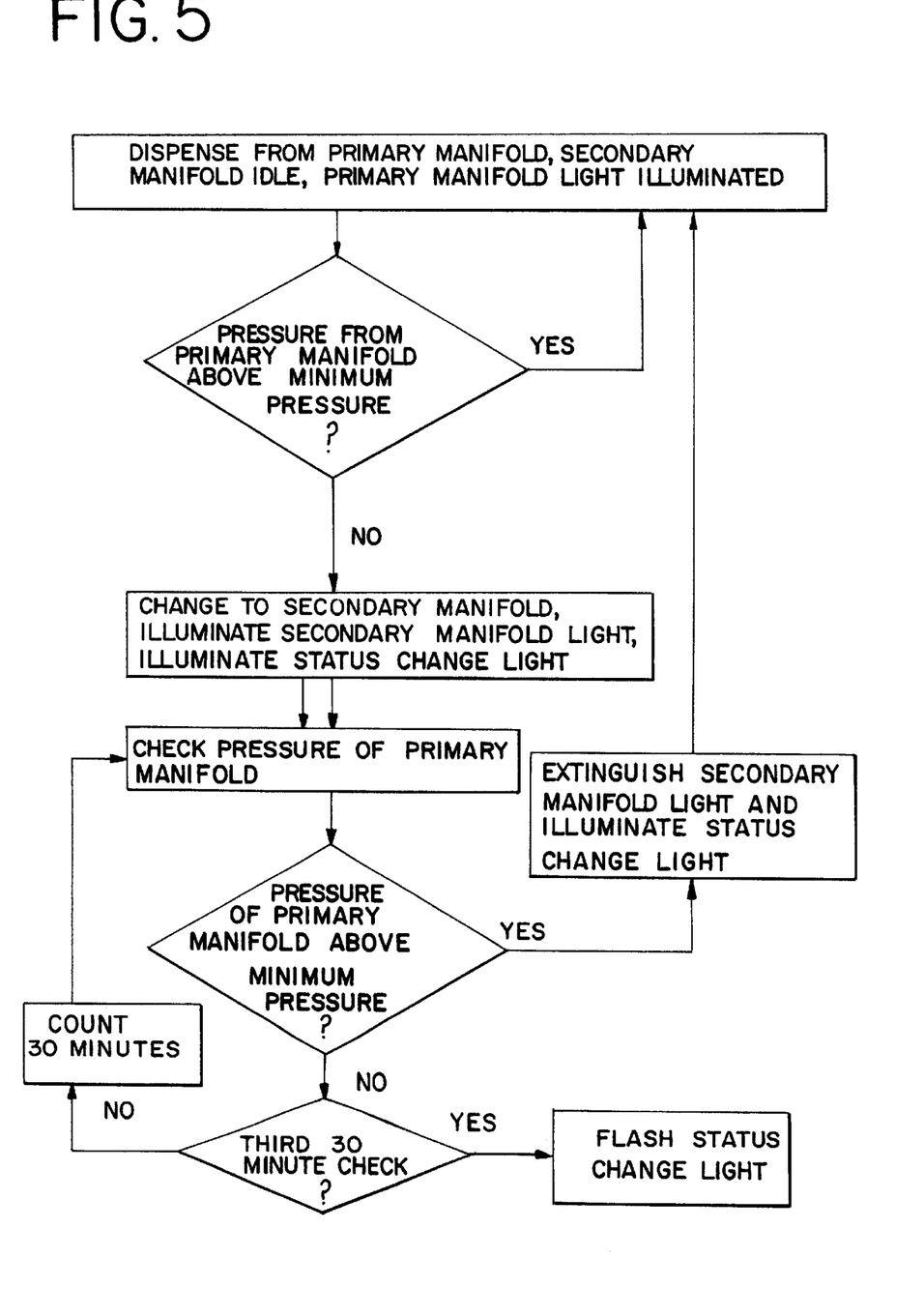
FIG. 5 is a flow diagram illustrating the logic of the controller of FIG. 3.

FIG. 4A illustrates the system operating with the primary bank manifold 52 selected. As such, the system dispenses liquid from cylinders 50a and 50b to the use point through line 96. Pressure gauge and switch 98 monitors the pressure of the cryogenic liquid flowing through the automatic control system 94 and valve 102 is open. Valve 101 is closed. Switch 120 of control panel 105 is set to the primary bank manifold and the primary bank manifold light 124 is illuminated. Secondary bank 56 is idle and no liquid is withdrawn from cylinders 130a and 130b.

Figure 4B:
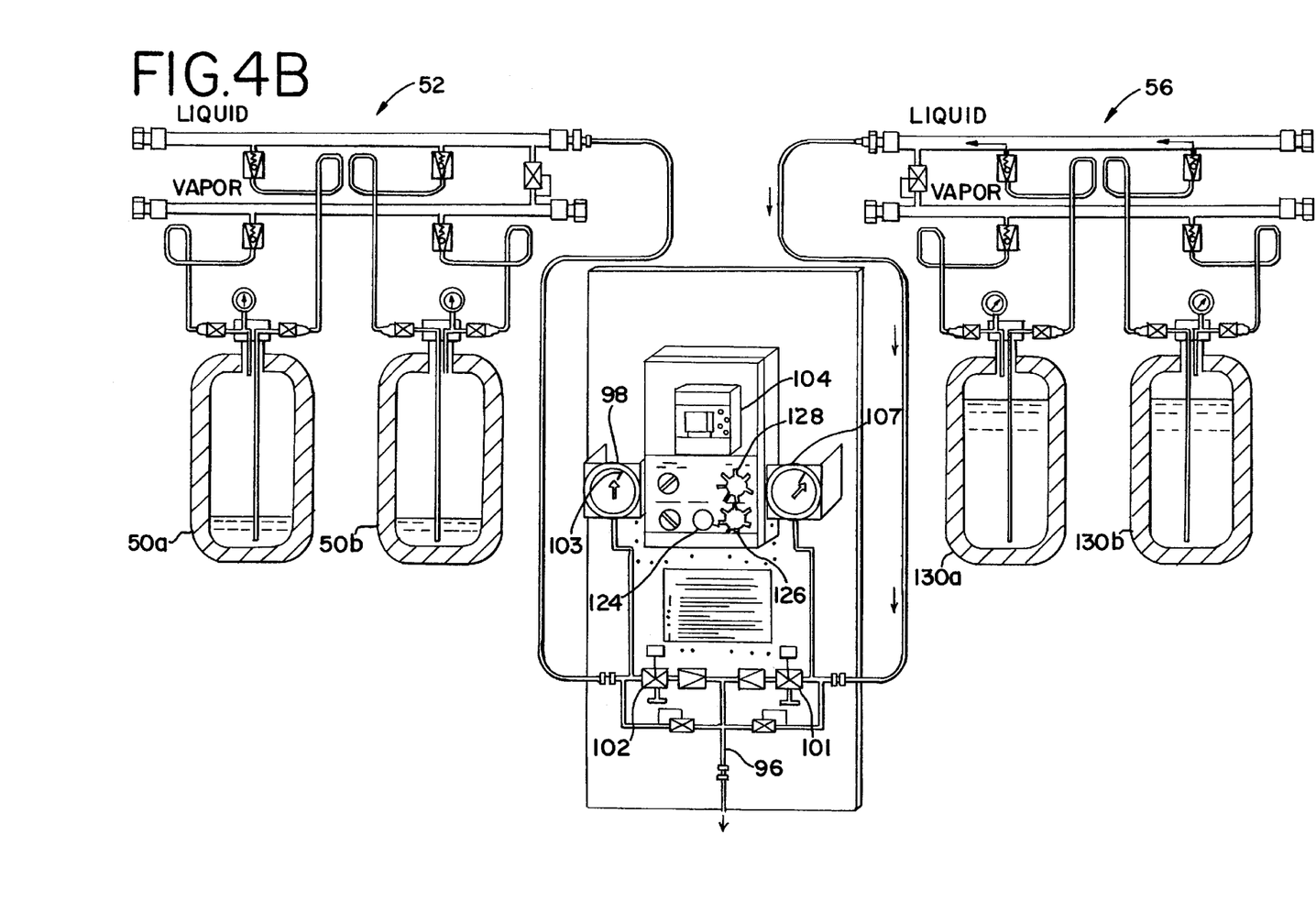

FIG. 4B illustrates the system when the liquid levels within cylinders 50a and 50b have dropped to the point where the pressure of the cryogenic liquid delivered by manifold 52 is significantly decreased. Indeed, in FIG. 4B, the pressure of the cryogenic liquid flowing through the automatic control system has dropped below the predetermined minimum pressure selected by the set point slider 103 of pressure gauge and switch 98. In response, pressure gauge and switch 98 has sent a signal to the controller 104 which in turn has transmitted a signal to valve 102 so that it has closed. In addition, controller 104 has sent a signal to valve 101 directing it to open. As a result, the secondary manifold 56 has been automatically selected so that cryogenic liquid is provided from cylinders 130a and 130b to the use point through line 96. The delivery of cryogenic liquid from cylinders 50a and 50b has been halted. Pressure gauge and switch 107 monitors the pressure of the cryogenic liquid being delivered to the control system from the manifold 56 to ensure that it does not drop below the predetermined minimum pressure level selected by set point slider 111.

As illustrated in FIG. 4B, controller 104 provides an indication of the status change via control panel 105. More specifically, controller 104 has extinguished the primary bank manifold light 124, illuminated the secondary bank manifold light 126 and the system status change light 128 has been illuminated.

As illustrated in FIG. 4B, while controller 104 has switched to the secondary bank manifold 56 so that dispensing of cryogenic liquid occurs from cylinders 130a and 130b, small quantities of residual liquid remain in cylinders 50a and 50b. As cylinders 50a and 50b sit idle, the pressure therein and in manifold 52 builds due to ambient heating. As a result, after a period of time has passed, cylinders 50a and 50b and manifold 52 become pressurized enough to dispense the residual liquid therein in a high pressure and high flow fashion. Controller 104 accommodates such an occurrence by checking the pressure indicated by pressure gauge and switch 98 approximately thirty minutes after the switch to the secondary bank manifold 56 has occurred. If the pressure indicated by gauge and switch 98 has not yet exceeded the predetermined minimum pressure of set point slider 106, dispensing continues from secondary bank manifold 56 and cylinders 130a and 130b. The controller checks pressure gauge and switch 98 two additional times in thirty minute intervals. If the pressure from primary bank manifold 52 and cylinders 50a and 50b still has not exceeded the predetermined minimum pressure of set point slider 106, controller 104 deems that cylinders 50a and 50b are empty and change out is required.

Figure 4C:
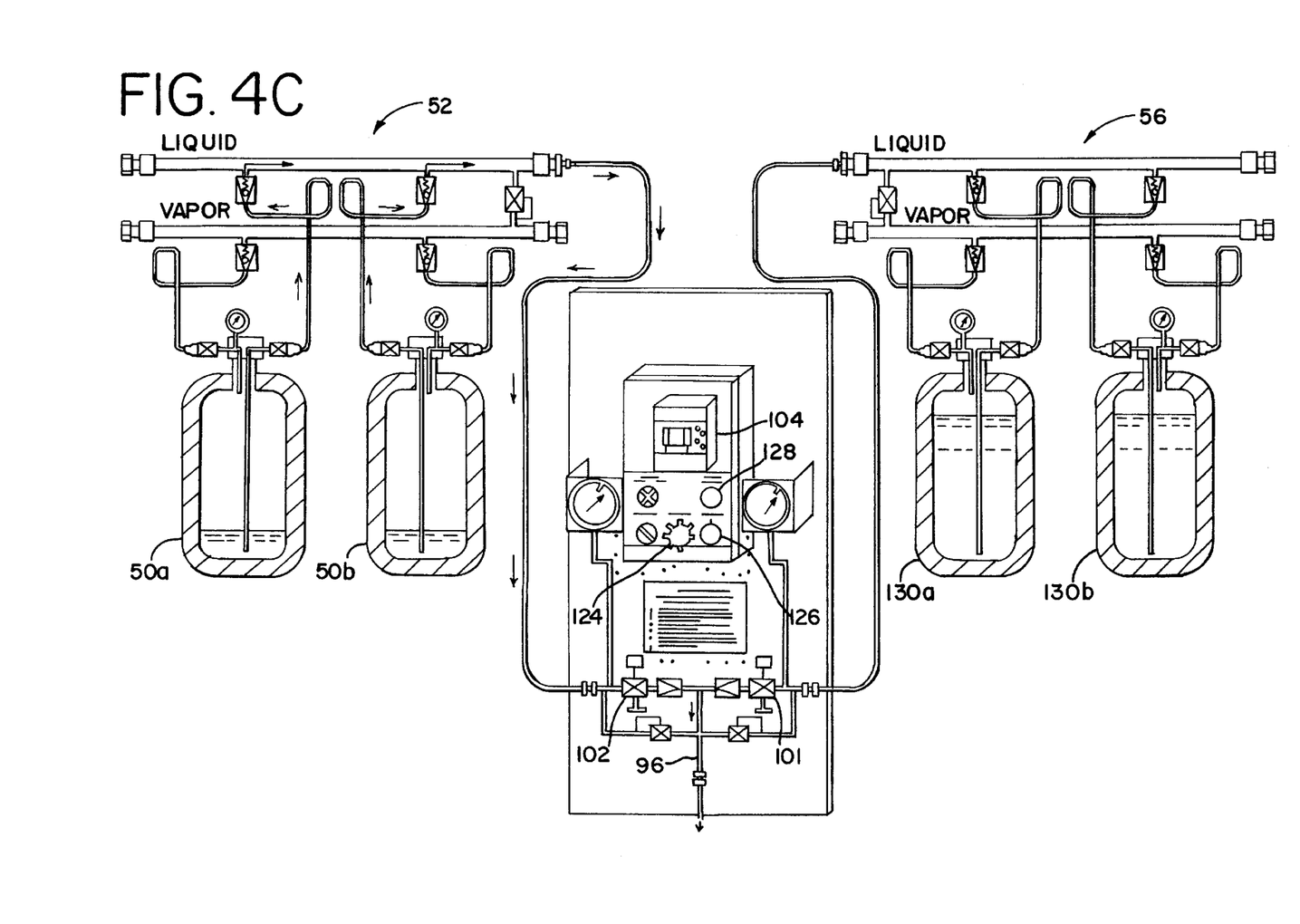

If, however, the pressure indicated by pressure gauge and switch 98 exceeds the predetermined pressure of set point slider 103, controller 104 reconfigures the system as illustrated in FIG. 4C. More specifically, controller 104 has opened valve 102 and closed valve 101 so that the residual liquid is withdrawn from cylinders 50a and 50b and dispensed through line 96 while cylinders 130a and 130b sit idle. In addition, primary bank manifold light 124 has been once again illuminated and the secondary bank manifold and system status lights have been extinguished.

Figure 4D:
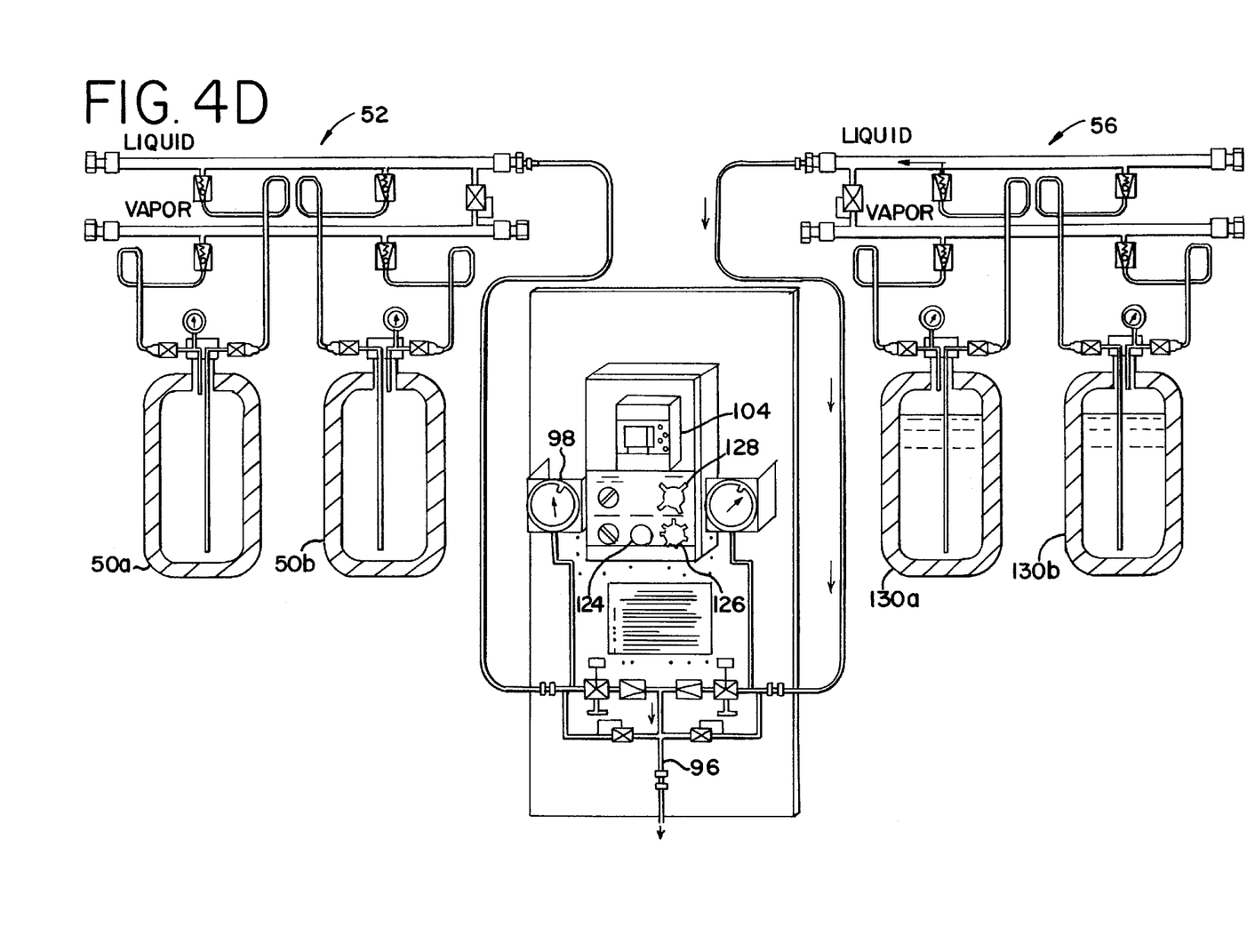

As illustrated in FIG. 4D, when all of the residual liquid has been removed from cylinders 50a and 50b, the system automatically once again reconfigures to draw cryogenic liquid from cylinders 130a and 130b via secondary bank manifold 56. After the controller 104 checks the pressure indicated by pressure gauge and switch 98 three times at thirty minute intervals, the status change light 128 blinks to indicate that cylinder change out is required. Of course, secondary bank manifold light 126 has been re-illuminated while primary bank manifold light 124 has been extinguished to indicate that the secondary manifold bank has been selected.

The economizer circuits 112 and 114 of FIG. 2 serve an additional important purpose beyond releasing gas from the cylinders and gas headers of the manifolds to the use point. When a manifold switch over occurs, residual liquid may be trapped in the liquid header of the newly idle manifold. The pressure within the liquid manifold will build as time passes. Gas from the liquid header may be directed past the closed control valve and to the use point through the appropriate economizer circuit when the pressure within the liquid manifold exceeds a predetermined limit. As a result, venting of the liquid header is avoided.

It should be noted that while indication lights on control panel 105 are illustrated in the figures of the application, alternative indication arrangements may be utilized by controller 104. For example, controller 104 could provide an audible indication of a status change or a telemetry transmission system could be attached to controller 104 to provide remote notification of a status change.

Figure 6:
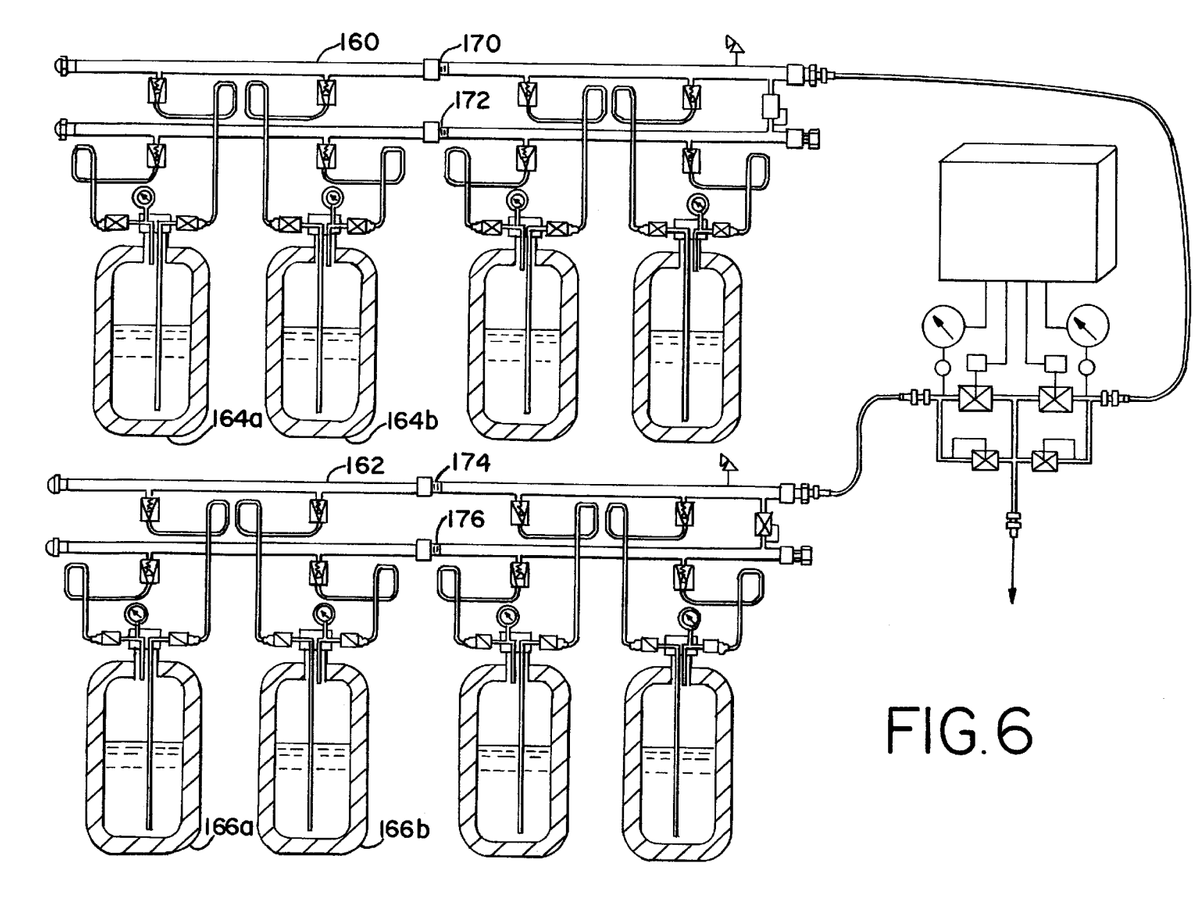
FIG. 6 is a schematic of diagram of the system of FIG. 2 reconfigured with additional liquid cylinders.
Figure 7:
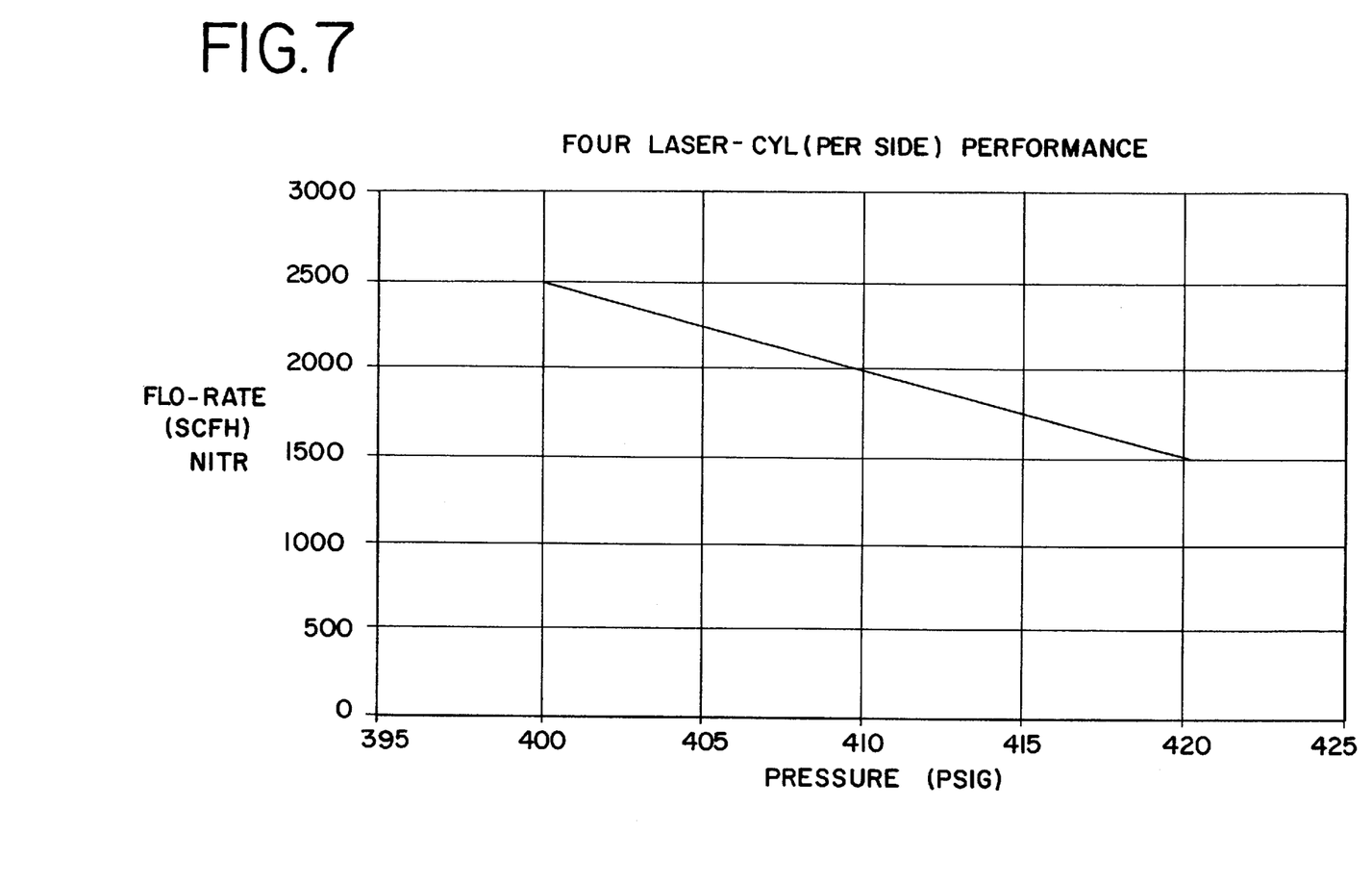
FIG. 7 is plot of the flow curves for the system of FIG. 6.

As illustrated in FIG. 6, additional manifold sections 160 and 162 with connected pairs of liquid cylinders 164a and 164b and 166a and 166b, respectively, may be added to the manifolds of the present invention via standard screw fittings 170–176. Alternative attachment arrangements known in the prior art may be used. As such, the manifold of the present invention offers a modular capability whereby additional liquid cylinders may be added to meet higher flow and pressure requirements. As an example, the flow rates and pressures that may be obtained from the system of FIG. 6 are illustrated by the curve of FIG. 7.

While the preferred embodiments of the invention have been shown and described, it will be apparent to those skilled in the art that changes and modifications may be made therein without departing from the spirit of the invention, the scope of which is defined by the appended claims.

What is claimed is:

1. A manifold for supplying cryogenic liquid from a plurality of cylinders, where each cylinder contains a quantity of liquid with a pressurized head space there above, comprising:
    a) a gas header having a plurality of ports, one each of said plurality of ports adapted to communicate with one each of the head spaces of the plurality of cylinders;
    b) a plurality of excess flow valves, one each in circuit between one each of the plurality of ports and one each of the head spaces of the plurality of cylinders;
    c) a liquid header having a plurality inlet ports and an outlet port, one each of the plurality of inlet ports adapted to communicate with one each of the quantities of liquid of the plurality of cylinders; and
    d) a plurality of check valves, one each in circuit between one each of the plurality of inlet ports of the liquid header and one each of the quantities of liquid of the plurality of cylinders;
    whereby liquid is withdrawn from each of the cylinders in a generally even fashion and delivered to a use point through the outlet port of the liquid header.

2. The manifold of claim 1 wherein the check valves are spring-loaded.

3. The manifold of claim 1 further comprising a plurality of dip tubes, one each of said plurality of dip tubes adapted to communicate with one each of the quantities of liquid of the plurality of cylinders and communicating with one each of the check valves.

4. The manifold of claim 1 wherein the plurality of ports of said gas header are adapted to communicate with the head spaces of the plurality of cylinders through a plurality of flexible lines and the plurality of inlet ports of said liquid header are adapted to communicate with the quantities of liquid of the plurality of cylinders also through the plurality of flexible lines.

5. The manifold of claim 4 wherein each of said plurality of lines includes a connector for quickly connecting to and disconnecting from one of the plurality of cylinders.

6. The manifold of claim 4 wherein each of said plurality of lines is constructed of stainless steel.

7. The manifold of claim 1 further comprising an economizer circuit connected between the gas header and the liquid header.

8. A manifold for supplying cryogenic liquid from first and second cylinders, each cylinder containing liquid with a pressurized head space there above, comprising:
    a) a gas header having a first port adapted to communicate with the head space of the first cylinder and a second port adapted to communicate with the head space of the second cylinder;
    b) a first excess flow valve in circuit between the first port of the gas header and the head space of the first cylinder and a second excess flow valve in circuit between the second port of the gas header and the head space of the second cylinder;
    c) a liquid header having first and second inlet ports and an outlet port, the first inlet port adapted to communicate with the liquid in the first cylinder and the second inlet port adapted to communicate with the liquid in the second cylinder; and
    d) a first check valve in circuit between the first inlet port of the liquid header and the liquid of the first cylinder and a second check valve in circuit between the second inlet port of the liquid header and the liquid of the second cylinder;
    whereby liquid is withdrawn from the first and second cylinders in a generally even fashion and delivered to a use point through the outlet port of the liquid header.

9. The manifold of claim 8 wherein the check valves are spring-loaded.

10. The manifold of claim 8 further comprising first and second dip tubes, said first dip tube adapted to communicate with the quantity of liquid in the first cylinder and communicating with the first check valve and said second dip tube adapted to communicate with the quantity of liquid in the second cylinder and communicating with the second check valve.

11. The manifold of claim 8 wherein the first port of the gas header is adapted to communicate with the head space of the first cylinder through a first flexible line and the second port of the gas header is adapted to communicate with the head space of the second cylinder through a second flexible line.

12. The manifold of claim 8 wherein the first inlet port of the liquid header is adapted to communicate with the quantity of liquid of the first cylinder through a first flexible line and the second inlet port of the liquid header is adapted to communicate with the quantity of liquid of the second cylinder through a second flexible line.

13. The manifold of claim 8 further comprising an economizer circuit connected between the gas header and the liquid header.

* * * * *